United States Patent
Jin et al.

(10) Patent No.: US 10,889,745 B1
(45) Date of Patent: Jan. 12, 2021

(54) PLUGGING AGENT WITH TEMPERATURE-RESISTANT, SALT-RESISTANT AND HIGH-EXPANSION FOR PLUGGING LARGE FRACTURES AND PREPARATION METHOD THEREOF

(71) Applicant: SOUTHWEST PETROLEUM UNIVERSITY, Chengdu (CN)

(72) Inventors: Fa Yang Jin, Chengdu (CN); Wan Fen Pu, Chengdu (CN); Wen Ge Hu, Chengdu (CN); Hai Yang Zhao, Chengdu (CN); Long He, Chengdu (CN); Dai Jun Du, Chengdu (CN); Ke Xing Li, Chengdu (CN); Bao Lei Jiao, Chengdu (CN); Bo Ren, Chengdu (CN); Lin Sun, Chengdu (CN); Zhen Qian, Chengdu (CN); En Long Zhen, Chengdu (CN); Rui Liu, Chengdu (CN); Xiao Qing He, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 17/020,854

(22) Filed: Sep. 15, 2020

(30) Foreign Application Priority Data

Dec. 17, 2019 (CN) .......................... 2019 1 1301249

(51) Int. Cl.
*C09K 8/42* (2006.01)
*C09K 8/512* (2006.01)
(Continued)

(52) U.S. Cl.
CPC ............ *C09K 8/426* (2013.01); *C04B 14/104* (2013.01); *C04B 26/04* (2013.01); *C09K 8/512* (2013.01)

(58) Field of Classification Search
CPC ...... C09K 8/426; C09K 8/512; C04B 14/104; C04B 26/04; C08K 3/346; C08L 33/02; C08L 33/26
See application file for complete search history.

(56) References Cited

U.S. PATENT DOCUMENTS

| | | | |
|---|---|---|---|
| 8,985,212 B1 | 3/2015 | Crespo et al. | |
| 9,550,879 B2 * | 1/2017 | Donovan | ........... B01J 20/28016 |

FOREIGN PATENT DOCUMENTS

| | | |
|---|---|---|
| CN | 105368424 A | 3/2016 |
| CN | 106188403 A | 12/2016 |
| CN | 110105939 A | 8/2019 |

OTHER PUBLICATIONS

Machine-generated English-language translation of CN110105939A. (Year: 2019).*

(Continued)

*Primary Examiner* — Vu A Nguyen

(57) ABSTRACT

A plugging agent with temperature-resistant, salt-resistant and high-expansion for plugging large fractures and a preparation method thereof of the present disclosure are provided, the plugging agent system consists of the following components: main agent: 6%~10%, cross-linking agent: 0.6%~1%, initiator: 0.006%~0.01%, additive: 6%~14%, and the rest being water; the preparation method includes the following steps: adding montmorillonite to water to prepare a montmorillonite dispersion system; adding the main agent, the cross-linking agent and the initiator to the montmorillonite dispersion system to prepare a main agent solution; putting the main agent solution into an oven with a temperature range with 90~20° C. for 9~48 h to obtain gelation, the adhesive strength of the agent system can reach grade H, with 50~80 expansion multiple, good strength after being (Continued)

expanded and good water plugging effect under the condition of a temperature of 140° C. and 250,000 degree of mineralization.

2 Claims, 1 Drawing Sheet

(51) Int. Cl.
*C04B 14/10* (2006.01)
*C08K 3/34* (2006.01)
*C08L 33/02* (2006.01)
*C08L 33/26* (2006.01)
*C04B 26/04* (2006.01)

(56) References Cited

OTHER PUBLICATIONS

Machine-generated English-language translation of CN110387222A. (Year: 2019).*

* cited by examiner

PLUGGING AGENT WITH TEMPERATURE-RESISTANT, SALT-RESISTANT AND HIGH-EXPANSION FOR PLUGGING LARGE FRACTURES AND PREPARATION METHOD THEREOF

CROSS-REFERENCE TO RELATED APPLICATION

This application claims the benefit of priority from Chinese Patent Application No. 201911301249.5 entitled "PLUGGING AGENT WITH TEMPERATURE-RESISTANT, SALT-RESISTANT AND HIGH-EXPANSION FOR PLUGGING LARGE FRACTURES AND PREPARATION METHOD THEREOF" and filed on Dec. 17, 2019, the content of which is hereby incorporated by reference in its entire by reference.

BACKGROUND

Technical Field

The present disclosure generally relates to a technical field of oil and gas field development, and relates to a plugging agent with temperature-resistant, salt-resistant and high-expansion for plugging large fractures and a preparation method thereof.

Description of Related Art

Reservoirs with high-temperature and high-salinity are generally characterized by a high-temperature (90-150° C.) and a high salinity (12×104–20×104 mg/L). Under the condition of high-temperature and high-salt reservoir, a traditional plugging agent is prone to poor stability, dehydration and strength. During water plugging, if the strength of the plugging agent is not enough, a series of problems will still occur after water plugging, such as high water cut, rapid decline of oil well production after recovery, and a short validity period. Therefore, it is a key of improving oil recovery and reducing cost in high water cut oilfields to solve a problem of excessive water and improve water plugging effect of the plugging agent in large fractures reservoirs and fracture-hole reservoirs.

Some conventional plugging agent technologies, such as a polymer nanosphere disclosed in Chinese patent with patent NO. CN 109913189 A, have a maximum expansion multiple of about 14 times, although they have temperature-resistant and salt-resistant performances. Since its particle size is nanometer to be good for plugging high permeability layers and small fractures rather than plugging large fractures and fracture-holes. Therefore, for reservoirs with large fractures, it is necessary to develop plugging agents with larger particle size and better expansion performances for water plugging. Chinese patent with patent NO. CN 86108877 A discloses a zirconium gel plugging agent consisting of gelatinizing agent PAM and inorganic zirconium compounds cross-linking agent, which can be used for selective water plugging in oil wells and injection wells to adjust a profile of water absorption. Despite it has good thermal stability and a high water plugging rate, there are still many technical problems to be solved for this kind of polymer gel with high-temperature and high-salt oil reservoirs in western China. For example, polymers in the gel are easy to degrade in a high-temperature condition so as to damage its structure. High salinity may cause dewatering, volume shrinkage and strength reduction of gel plugging agents in formation. Chinese patent with patent NO. CN 102040975 A discloses a silicate water plugging agent with a convenient configuration and a low price, however, this kind of plugging agent has a low strength and a short gelation time in a high-temperature condition, so that its field application is limited. There's also a gel consisting of lignin sulfonate, phenol, formaldehyde and polymer, because of its high toxicity, phenolic resin is restricted in the field, which is not conducive to environmental protection. And, it is not suitable for high-temperature and high-salt reservoirs due to limitation by a gel forming time, a pH vale and a temperature range. Therefore, research and development of a water plugging system suitable for high-temperature and high-salt reservoirs is of great significance to further improve a recovery rate of water channeling reservoirs with large fractures and even reservoirs with fracture-holes.

SUMMARY

The technical problems to be solved: in view of the shortcomings of the related art, the present disclosure relates to a plugging agent with temperature-resistant, salt-resistant and high-expansion for plugging large fractures and a preparation method thereof which can have good performances of temperature-resistant and salt-resistant, a strong gelation strength and a high expansion multiple, and is suitable for a deep water plugging operation for plugging water channeling channel of large fractures in high-temperature and high-salt reservoir conditions.

The present disclosure also provides a plugging agent system with temperature-resistant, salt-resistant and high-expansion for plugging large fractures, which is cross-linked by main agent, phenolic cross-linking agent, azo initiator and montmorillonite additive. In the process, a final gelation time and a final expansion multiple are controlled by controlling the proportion of the main agent, and the montmorillonite additive is added to increase gelation strength of the system. The mass percentage of each component of the system is as follows.

The technical solution adopted for solving technical problems of the present disclosure is:

A plugging agent with temperature-resistant, salt-resistant and high-expansion for plugging large fractures according to an embodiment of the present disclosure, consisting of the following raw materials with a mass ratio:

main agent: 6%~10%,
cross-linking agent: 0.6%~1%,
initiator: 0.006%~0.01%,
additive: 6%~14%, and
the rest being water; and wherein
the main agent is composed of monomer 1 and acrylamide with an equal mass ratio, the monomer 1 is a mixture of acrylic acid and 2-acrylamide-2-methylpropylsulfonic acid; the additive is montmorillonite, the cross-linking agent is phenolic cross-linking agent prepared by phenol and formaldehyde at a mass ratio of 1:9, and the initiator is azo initiator.

A preparation method of the plugging agent with temperature-resistant, salt-resistant and high-expansion for plugging large fractures according to an embodiment of the present disclosure, includes the following steps:

A1, preparing a montmorillonite dispersion system: slowly adding the montmorillonite to stirred water and stirring for 4~5 hours at a stirring speed of 200~300 r/min to obtain the montmorillonite dispersion system;

A2, preparing main agent solution: adding the main agent, the cross-linking agent and the initiator to the montmorillonite dispersion system and then stirring evenly to obtain the main agent solution;

A3, preparing plugging agent: putting the main agent solution into an aging tank to be sealed, and then placing the aging tank under a temperature condition with 90~120° C. to gelatinize for 9~48 hours, so as to obtain the plugging agent with temperature-resistant, salt-resistant and high-expansion for plugging large fractures.

The present disclosure provides the advantages as below.

The plugging agent system of the present disclosure can enhance final gelation strength of the system through the montmorillonite additive. More than 50 expansion multiple of the system after being gelatinized in clear water can be obtained by adjusting the quality of the main agent, which is suitable for water plugging requirements of high-yielding liquid and high-pressure production wells, and can meet needs of different heterogeneous reservoirs for the plugging agent with high strength and high expansion ratio. The plugging agent system of the present disclosure has good high-temperature and high-salt performances, and good plugging effect under the condition of a temperature of 140° C. and 250,000 degree of mineralization, and suitable for a deep adjustment and plugging operation in high-temperature, high-salt reservoir conditions. Therefore, the present disclosure is suitable for a profile control and a water plugging operation for plugging water in high-temperature, high-salt reservoir conditions with large fractures.

DETAILED DESCRIPTION

Figure 1:
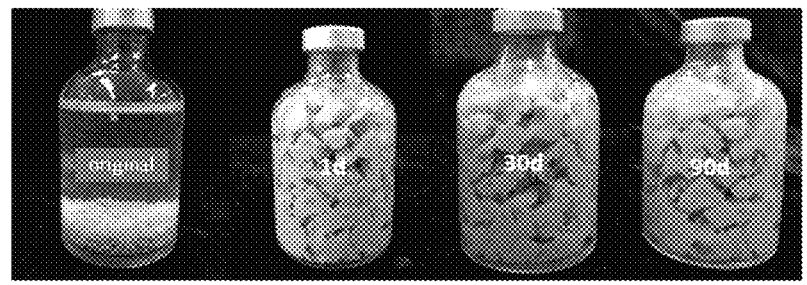
FIG. 1 is an expansion schematic view of a plugging agent with 250,000 degree of mineralization in accordance with a first embodiment of the present disclosure.

In order to more clearly understand and implement the present disclosure for one of ordinary skill in the related art, the principles and characteristics of the present disclosure are described on the basis of these drawings and embodiments; the examples cited are provided only to interpret the present disclosure, but not to limit the scope of the present disclosure.

(I) Embodiment

A First Embodiment

Step A1: Preparing a Montmorillonite Dispersion System

Adding 10 g montmorillonite to 82.2 g water solution being stirred in an agitator for 5 h, with the agitator running at 200 r/min, so that the montmorillonite can thoroughly mix into the water to obtain the montmorillonite dispersion system.

Step A2: Preparing a Main Agent Solution

The main agent prepared by 3 g acrylamide (AM), 2 g acrylic acid (AA) and 1 g 2-acrylamide-2-methylpropylsulfonic acid (AMPS), 0.8 g phenolic cross-linking agent and 1 g azobisisobutylene initiator with a concentration of 1% is added to the montmorillonite dispersion prepared in the step A1, the main agent, the cross-linking agent and the initiator can be dissolved into the montmorillonite dispersion system by stirring evenly with a glass rod so as to obtain a main agent solution.

Step A3: Preparing a Plugging Agent

Putting the prepared solution into an aging tank, and tightening the aging tank by bolts for sealing the prepared solution, and then putting the aging tank into an oven with a temperature of 120° C. for reaction, recording changes of adhesive strength, observing complete gelatinization, and then granulating with a grinding machine to obtain sample 1.

Samples 2~5 are respectively prepared by changing monomer ratios of each main agent according to the steps A1~A3, and specific composition of samples 1~5 is shown in Table 1.

TABLE 1

Formula table of samples 1~5

| group | main agent AA (g) | main agent AMPS (g) | main agent AM (g) | water (g) | montmorillonite (g) | initiator (g) | cross-linking agent (g) |
|---|---|---|---|---|---|---|---|
| sample 1 | 2 | 1 | 3 | 82.2 | 10 | 1.0 | 0.8 |
| sample 2 | 2.3 | 1.2 | 3.5 | 81.2 | | | |
| sample 3 | 2.7 | 1.3 | 4 | 80.2 | | | |
| sample 4 | 3 | 1.5 | 4.5 | 79.2 | | | |
| sample 5 | 3.3 | 1.7 | 5 | 78.2 | | | |

A Second Embodiment

Step A1: Preparing a Montmorillonite Dispersion System

Adding 6 g montmorillonite to 83.2 g water solution stirring for 5 h, so that the montmorillonite can thoroughly mix into the water to obtain the montmorillonite dispersion system.

Step A2: Preparing a Main Agent Solution

The main agent prepared by 4.5 g acrylamide (AM), 1.5 g 2-acrylamide-2-methylpropylsulfonic acid (AMPS) and 3 g acrylic acid (AA), 0.8 g phenolic cross-linking agent and 1 g azobisisobutylene initiator with a concentration of 1% is added to the montmorillonite dispersion prepared in the step A1, the main agent, the cross-linking agent and the initiator can be dissolved into the montmorillonite dispersion system by stirring evenly so as to obtain main agent solution.

Step A3: Preparing a Plugging Agent

Putting the prepared solution into an aging tank, and tightening the aging tank by bolts for sealing the prepared solution, and then putting the aging tank into an oven with a temperature of 120° C. for reaction, recording gelatinization during the reaction process, and when the gelatinization of the system did not change for a long time, the gelatinization is completed to obtain sample 6.

Samples 7~10 are respectively prepared by changing the proportion of the montmorillonite and the water according to the steps A1~A3, and specific composition of samples 6~10 is shown in Table 2.

TABLE 2

Formula table of samples 6~10

| group | main agent (g) | water (g) | montmorillonite (g) | initiator (g) | cross-linking agent (g) |
|---|---|---|---|---|---|
| sample 6 | 9 | 83.2 | 6 | 1.0 | 0.8 |
| sample 7 | | 81.2 | 8 | | |

TABLE 2-continued

Formula table of samples 6~10

| group | main agent (g) | water (g) | montmorillonite (g) | initiator (g) | cross-linking agent (g) |
|---|---|---|---|---|---|
| sample 8 | | 79.2 | 10 | | |
| sample 9 | | 77.2 | 12 | | |
| sample 10 | | 75.2 | 14 | | |

(II) Performance Text

1) Adhesive Strength Test

The main agent solution in samples 1~10 is sealed in the aging tank and then put into the oven at 120° C. for gelation. Strength of each sample at different gelation times is shown in Table 3 and Table 4.

TABLE 3

Adhesive strength table of samples 1-5

| | time ( h) | | | | | | | |
|---|---|---|---|---|---|---|---|---|
| group | 2 | 7 | 9 | 15 | 24 | 48 | 72 | 96 |
| sample 1 | A | B | C | D | E | F | G | H |
| sample 2 | A | C | D | F | G | G | H | H |
| sample 3 | A | C | E | G | G | G | H | H |
| sample 4 | B | E | F | H | H | H | H | H |
| sample 5 | D | E | H | H | H | H | H | H |

TABLE 4

Adhesive strength table of samples 6~10

| | time (h) | | | | | | | |
|---|---|---|---|---|---|---|---|---|
| group | 2 | 7 | 9 | 15 | 24 | 48 | 72 | 96 |
| sample 6 | B | B | C | E | G | H | H | H |
| sample 7 | B | B | C | F | G | H | H | H |
| sample 8 | B | C | C | E | F | H | H | H |
| sample 9 | B | C | D | F | H | H | H | H |
| sampe 10 | C | D | D | F | H | H | H | H |

It can be seen from Table 3 and Table 4 that the gelation time of the plugging agent of the present disclosure is above 9 h, and the final gelation strength can be controlled according to an amount of the montmorillonite and an amount of the main agent.

2) Expansion Multiple Test

Samples with a same quality are taken from sample 1 to sample 10 and placed in an oven with a temperature 90° C. (the samples placed in penicillin bottles with clear water) for 4 hours and one day to test the expansion multiple. Specific results can be seen in Table 5:

TABLE 5

Test of glue expansion multiple of sample 1 to sample 10

| expansion multiple (g/g) | sample 1 | sample 2 | sample 3 | sample 4 | sample 5 | sample 6 | sample 7 | sample 8 | sample 9 | sample 10 |
|---|---|---|---|---|---|---|---|---|---|---|
| 4 h | 20 | 30 | 32 | 37 | 47 | 34 | 34 | 35 | 37 | 50 |
| 1 d | 50 | 58 | 64 | 75 | 80 | 74 | 77 | 77 | 75 | 74 |

It can be seen from the above two performance tests that the expansion multiple is mainly related to the mass fraction of the main agent; the higher the mass fraction of the main agent, the greater the expansion multiple of the system samples in a same time. A final gelation time is related to the amount of the main agent and the montmorillonite additive. The interaction between the montmorillonite additives and the particles of an original system and gaps filling can minimize the gaps, form a high concentration solid particle content system, increase van der Waals force between particles, and further increase the final gelation strength of the system. The final gelation time of the system can be reduced by increasing the concentration of the main agent or the montmorillonite.

3) Expansion Multiple Test of the Present Disclosure Under a High-Temperature and High-Salt Condition The sample 1 is selected as a test sample of the system with high-temperature and high-salt performances and then is dried and ground into particles, and 0.5 g particles are selected to be sealed in an ampere bottle with 250,000 degree of mineralization water. Furthermore, the sealed ampere bottle is put into an explosion-proof box, and then is put into the oven with 140'C temperature to observe changes of the particles in the ampere bottle. The changes of the sample 1 are shown in FIG. 1.

It can be seen that the expansion multiple of the particles under the condition of formation water with 250,000 degree of mineralization is more than 20 times, which is less than that under clear water on the whole. Under the conditions of 140° C. temperature and formation water with 250,000 degree of mineralization, the particles remained in the shape of particles after being placed for 90 days, without being broken, that is, under the condition of high-temperature and high-salt, the particles of the sample 1 still has a stable plugging control ability, which can meet a demand of profile control and water plugging in large fractures and strong heterogeneous reservoir.

4) Plugging Effect of the Present Disclosure in a Fracture Model

Figure 2:
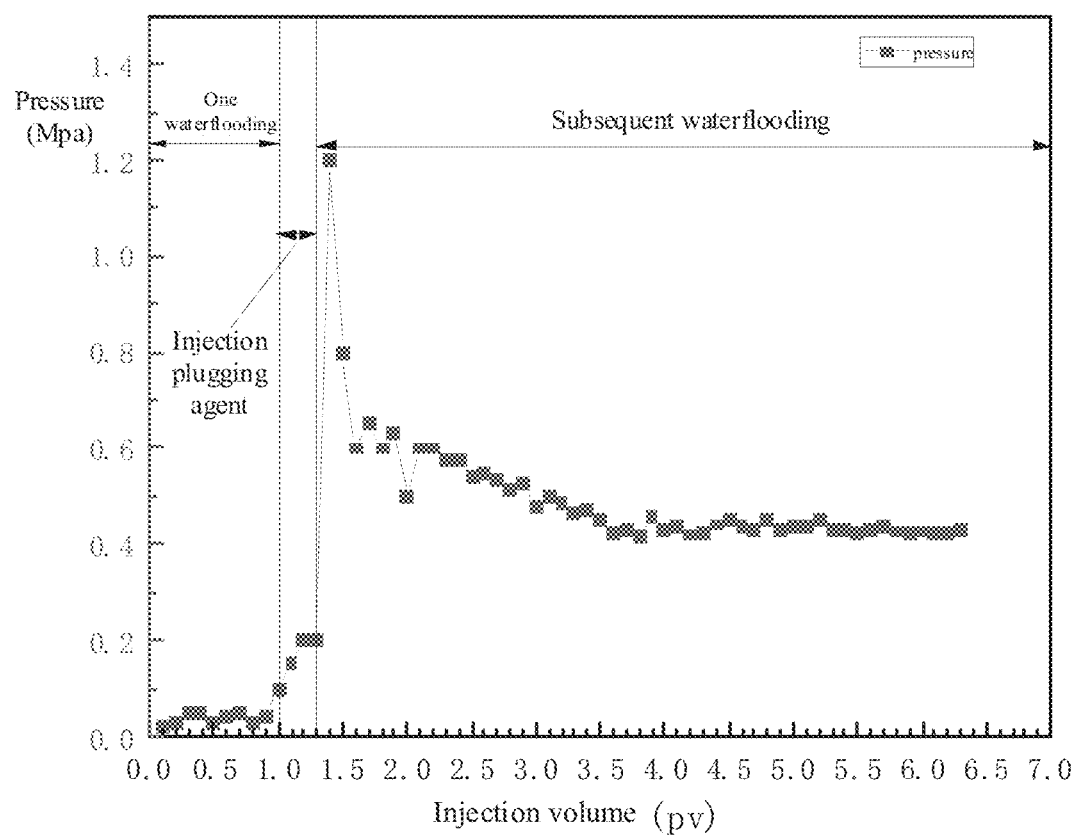
FIG. 2 is a schematic pressure change view of a large fracture model plugged with the plugging agent before and after.

According to the formation characteristics of a fractured reservoir, three rock cores are selected for the experiment. The core is completely slit along its diameter to obtain a fracture with a width of 2 mm. Water used in the experiment is formation water with 250,000 degree of mineralization. Experiment steps are as follows: first measuring a pore volume of the model with saturated water (rate: 1 mL/min) and then with saturated oil (rate: 0.5 mL/min), so as to record original oil saturation. And then, performing water flooding (rate: 0.5 ml/min) on the model to 98% moisture content; after completing water flooding, injecting plugging agent with a volume of 0.3 PV at a rate of 0.3 mL/min, and then performing subsequent water flooding on the model after being placed at a temperature of 90° C. for 24 h. Subsequent water flooding at 1 PV, 3 PV and 5 PV are carried out in three groups of experiments, respectively, to observe and compare the changes of the plugging performance after the system is scour by different injected fluids. At the same time, during the injection process, recording pressure changes during water flooding before and after, and recording the injection pressure change at every 0.1 PV, and the pressure changes of subsequent experiments with water flooding of 5 PV are shown in FIG. 2.

The plugging rate of different subsequent water flooding volumes is shown in Table 6:

TABLE 6

Changes of plugging rate under different subsequent water flooding volumes

| rock core serial number | original permeability $K_1$ (mD) | permeability after plugging agent injection $K_2$ (mD) | residual resistance factor | plugging (%) |
|---|---|---|---|---|
| 1 | 2727.96 | 5.00 | 545.59 | 99.82 |
| 2 | 2843.16 | 5.59 | 505.62 | 99.80 |
| 3 | 2828.77 | 8.85 | 319.64 | 99.68 |

From the above experiments, it can be seen that in the fracture model, the plugging agent has a good adsorption capacity in the fracture after gelation, a plugging rate of the fracture can reach more than 99% even if the subsequent water flooding up to 5 PV is performed after injecting the plugging agent, at the same time, the above experiment results also prove that the present disclosure is extremely scour resistant. The plugging rate can still reach more than 99% after being scouring by a large amount water flooding.

The plugging agent system with temperature-resistant, salt-resistant and high-expansion for plugging large fractures of the present disclosure is to control the expansion multiple of the system by adjusting different proportions of monomers. The plugging system of the present disclosure is of a high expansion multiple and a strong gelation effect so that particles are hardly broken after the system is expanded under a condition of high-temperature and high-salt. Thus, the present disclosure not only can meet a required intensity of the experiments, but also is the key to realize water plugging operation with high-temperature, high-salt, large-fracture and strong heterogeneous reservoir, adjust reservoir heterogeneity and improve oil recovery.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A plugging agent with temperature-resistant, salt-resistant and high-expansion for plugging large fractures, consisting of the following raw materials by mass ratio:
    main agent: 6%~10%,
    cross-linking agent: 0.6%~1%
    initiator: 0.006%~0.01%,
    additive: 6%~14%, and
    the rest being water; and wherein
    the main agent is composed of monomer 1 and acrylamide with an equal mass ratio, the monomer 1 is a mixture of acrylic acid and 2-acrylamide-2-methylpropylsulfonic acid; the additive is montmorillonite, the cross-linking agent is phenolic cross-linking agent prepared by phenol and formaldehyde at a mass ratio of 1:9, and the initiator is azo initiator.

2. A preparation method of the plugging agent with temperature-resistant, salt-resistant and high-expansion for plugging large fractures as claimed in claim 1, wherein the method comprises the following steps:
    A1, preparing a montmorillonite dispersion system: slowly adding the montmorillonite to stirred water and stirring for 4 h~5 h at a stirring speed of 200~300 r/min to obtain the montmorillonite dispersion system;
    A2, preparing a main agent solution: adding the main agent, the cross-linking agent and the initiator to the montmorillonite dispersion system and then stirring evenly to obtain the main agent solution; and
    A3, preparing a plugging agent: putting the main agent solution into an aging tank to be sealed, and then placing the aging tank under a temperature condition with 90~120° C. to gelatinize for 9~48 hours, so as to obtain the plugging agent with temperature-resistant, salt-resistant and high-expansion for plugging large fractures.

* * * * *